US011871494B1

(12) United States Patent
Huang et al.

(10) Patent No.: US 11,871,494 B1
(45) Date of Patent: Jan. 9, 2024

(54) LIGHTING CONTROL METHOD, DEVICE, PRODUCT, STORAGE MEDIUM, AND LIGHTING CONTROL SYSTEM

(71) Applicants: Shenzhen Intellirocks Tech. Co., Ltd., Shenzhen (CN); Shenzhen Qianyan Technology Ltd., Shenzhen (CN)

(72) Inventors: Shuxin Huang, Shenzhen (CN); Wenlong Wu, Shenzhen (CN)

(73) Assignees: Shenzhen Intellirocks Tech. Co., Ltd., Shenzhen (CN); Shenzhen Qianyan Technology LTD., Shenzhen (CN)

( * ) Notice: Subject to any disclaimer, the term of this patent is extended or adjusted under 35 U.S.C. 154(b) by 0 days.

(21) Appl. No.: 18/469,500

(22) Filed: Sep. 18, 2023

(30) Foreign Application Priority Data

Mar. 30, 2023 (CN) .......................... 202310329354.X

(51) Int. Cl.
*H05B 47/11* (2020.01)
*H05B 47/155* (2020.01)
*H05B 47/165* (2020.01)

(52) U.S. Cl.
CPC ........... *H05B 47/11* (2020.01); *H05B 47/155* (2020.01); *H05B 47/165* (2020.01)

(58) Field of Classification Search
CPC ..... H05B 47/11; H05B 47/155; H05B 47/165
See application file for complete search history.

(56) References Cited

U.S. PATENT DOCUMENTS

| 2015/0312990 | A1* | 10/2015 | van de Ven | ............ | H05B 45/20 315/186 |
| 2015/0342002 | A1* | 11/2015 | Jørgensen | ............... | H05B 45/20 315/297 |
| 2019/0394853 | A1* | 12/2019 | Soer | ..................... | F21V 23/0478 |
| 2020/0260548 | A1* | 8/2020 | Slivka | ..................... | H05B 45/22 |

FOREIGN PATENT DOCUMENTS

CN          113347757 A   *  9/2021

OTHER PUBLICATIONS

Machine Translation of CN113347757A. (Year: 2021).*

* cited by examiner

*Primary Examiner* — Alexander H Taningco
*Assistant Examiner* — Pedro C Fernandez
(74) *Attorney, Agent, or Firm* — KIP Legal Services, PLLC

(57) ABSTRACT

A lighting control method includes: receiving light-emitting color data, the light-emitting color data including color values corresponding to a plurality of preset light-emitting channels; determining at least one additional light-emitting channel other than the plurality of preset light-emitting channels among the actual light-emitting channels of a lighting device; generating a color value of the additional light-emitting channel according to color values of the plurality of preset light-emitting channels in the light-emitting color data, and using the color values corresponding to the plurality of preset light-emitting channels and the additional light-emitting channel as target light-emitting color data; and transmitting the target light-emitting color data to (Continued)

each lamp bead chip in the lighting device to control corresponding lamp beads to emit light according to the color values corresponding to the actual light-emitting channel to which the lamp beads belong.

12 Claims, 5 Drawing Sheets

LIGHTING CONTROL METHOD, DEVICE, PRODUCT, STORAGE MEDIUM, AND LIGHTING CONTROL SYSTEM

CROSS-REFERENCES TO RELATED APPLICATIONS

This application claims priority to Chinese Patent Application No. CN202310329354.X, filed on Mar. 30, 2023, the content of which is hereby incorporated by reference in entirety.

FIELD OF THE TECHNOLOGY

The present disclosure relates to the technical field of lighting equipment control and, in particular, to a lighting control method, a lighting control device, a computer program product, a computer-readable storage medium, and a lighting control system.

BACKGROUND OF THE DISCLOSURE

Currently, lighting equipment generally uses the color values corresponding to the three RGB light-emitting channels as input. However, with the iterative innovation of multi-color light mixing technology, the number of light-emitting channels required by current lighting equipment is not limited to three light-emitting channels, but are more than three light-emitting channels. The color values corresponding to additional light-emitting channels are often manually set by technicians. However, this fixed setting solution has the problem of poor scalability, when there is a change in the number of additional light-emitting channels, it needs to be manually coordinated with the change. That is, the existing lighting equipment has the problem of poor compatibility in terms of color light mixing technology. The disclosed methods and apparatus are directed to solve one or more problems set forth above and other problems.

SUMMARY

According to one aspect of the present disclosure, a lighting control method is provided. The method includes: receiving light-emitting color data, the light-emitting color data including color values corresponding to a plurality of preset light-emitting channels; determining at least one additional light-emitting channel other than the plurality of preset light-emitting channels among the actual light-emitting channels of a lighting device; generating a color value of the additional light-emitting channel according to color values of the plurality of preset light-emitting channels in the light-emitting color data, and use the color values corresponding to the plurality of preset light-emitting channels and the additional light-emitting channel as target light-emitting color data; and transmitting the target light-emitting color data to each lamp bead chip in the lighting device to control corresponding lamp beads to emit light according to the color values corresponding to the actual light-emitting channel to which the lamp beads belong. The process of generating a color value of the additional light-emitting channel according to color values of the plurality of preset light-emitting channels in the light-emitting color data further includes: according to the color value of each preset light-emitting channel in the light-emitting color data, determining a maximum value and a minimum value, and calculating a saturation; matching a corresponding brightness ratio according to the saturation, and matching corresponding weights of the color values of the preset light-emitting channels in the light-emitting color data, and calculating a first color value, wherein the first color value is used as a color value of the additional light-emitting channel, and the additional light-emitting channel is a single channel and is used to emit white light; or, based on corresponding weights matched with color values of the additional light-emitting channels, and the first color value, determining the color values of the additional light-emitting channels, wherein the additional light-emitting light respectively; and using the color value of each preset light-emitting channel specified by the lighting color data as the color value corresponding to the same light-emitting channel in the actual light-emitting channels, and constructing the color values of the light-emitting channels in the actual light-emitting channels as target lighting color data.

According to another aspect of the present disclosure, a lighting control device is provided. The lighting control device includes a built-in control unit, at least one lamp bead chip, and a plurality of lamp beads controlled by the lamp bead chip. The control unit is used to run a computer program to, when the computer program is running, implement a lighting control method. The method includes: receiving light-emitting color data, the light-emitting color data including color values corresponding to a plurality of preset light-emitting channels; determining at least one additional light-emitting channel other than the plurality of preset light-emitting channels among the actual light-emitting channels of a lighting device; generating a color value of the additional light-emitting channel according to color values of the plurality of preset light-emitting channels in the light-emitting color data, and use the color values corresponding to the plurality of preset light-emitting channels and the additional light-emitting channel as target light-emitting color data; and transmitting the target light-emitting color data to each lamp bead chip in the lighting device to control corresponding lamp beads to emit light according to the color values corresponding to the actual light-emitting channel to which the lamp beads belong. The process of generating a color value of the additional light-emitting channel according to color values of the plurality of preset light-emitting channels in the light-emitting color data further includes: according to the color value of each preset light-emitting channel in the light-emitting color data, determining a maximum value and a minimum value, and calculating a saturation; matching a corresponding brightness ratio according to the saturation, and matching corresponding weights of the color values of the preset light-emitting channels in the light-emitting color data, and calculating a first color value, wherein the first color value is used as a color value of the additional light-emitting channel, and the additional light-emitting channel is a single channel and is used to emit white light; or, based on corresponding weights matched with color values of the additional light-emitting channels, and the first color value, determining the color values of the additional light-emitting channels, wherein the additional light-emitting channels include two different light-emitting channels that emit white cold light and white warm light respectively; and using the color value of each preset light-emitting channel specified by the lighting color data as the color value corresponding to the same light-emitting channel in the actual light-emitting channels, and constructing the color values of the light-emitting channels in the actual light-emitting channels as target lighting color data.

According to another aspect of the present disclosure, a non-transitory computer-readable storage medium is provided. The non-transitory computer-readable storage medium contains computer-executable program instructions for, when executed by one or more processors, performing a lighting control method. The method includes: receiving light-emitting color data, the light-emitting color data including color values corresponding to a plurality of preset light-emitting channels; determining at least one additional light-emitting channel other than the plurality of preset light-emitting channels among the actual light-emitting channels of a lighting device; generating a color value of the additional light-emitting channel according to color values of the plurality of preset light-emitting channels in the light-emitting color data, and use the color values corresponding to the plurality of preset light-emitting channels and the additional light-emitting channel as target light-emitting color data; and transmitting the target light-emitting color data to each lamp bead chip in the lighting device to control corresponding lamp beads to emit light according to the color values corresponding to the actual light-emitting channel to which the lamp beads belong. The process of generating a color value of the additional light-emitting channel according to color values of the plurality of preset light-emitting channels in the light-emitting color data further includes: according to the color value of each preset light-emitting channel in the light-emitting color data, determining a maximum value and a minimum value, and calculating a saturation; matching a corresponding brightness ratio according to the saturation, and matching corresponding weights of the color values of the preset light-emitting channels in the light-emitting color data, and calculating a first color value, wherein the first color value is used as a color value of the additional light-emitting channel, and the additional light-emitting channel is a single channel and is used to emit white light; or, based on corresponding weights matched with color values of the additional light-emitting channels, and the first color value, determining the color values of the additional light-emitting channels, wherein the additional light-emitting channels include two different light-emitting channels that emit white cold light and white warm light respectively; and using the color value of each preset light-emitting channel specified by the lighting color data as the color value corresponding to the same light-emitting channel in the actual light-emitting channels, and constructing the color values of the light-emitting channels in the actual light-emitting channels as target lighting color data.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

DETAILED DESCRIPTION

The following describes exemplary embodiments in detail, and examples of the embodiments are shown in the accompanying drawings, so as to better understand the present disclosure. Unless otherwise specified, a same number in different drawings may represent a same or similar element. The implementations described in the disclosed embodiments below do not represent all implementations consistent with the present disclosure, but are merely examples of the apparatus and the methods that are consistent with some aspects of the present disclosure, and should not be used for limiting the present disclosure. Further, as long as there is no conflict, the embodiments of the present disclosure and features of the embodiments may be combined with each other.

Those skilled in the art will understand that unless otherwise stated, the singular forms "a", "an", "said" and "the" used herein may also include plural forms. It should be further understood that the word "comprising" used in the description of the present disclosure refers to the presence of said features, integers, steps, operations, elements and/or components, but does not exclude the presence or addition of one or more other features, integers, steps, operations, elements and/or components, but does not preclude the presence or addition of one or more other features, integers, steps, operations, elements, components and/or groups thereof. It will be understood that when an element is referred to as being "connected" or "coupled" to another element, it can be directly connected or coupled to the other element or intervening elements may also be present. Additionally, "connected" or "coupled" as used herein may include wireless connection or wireless coupling. The expression "and/or" used herein includes all or any elements and all combinations of one or more associated listed items.

Those skilled in the art can understand that, unless otherwise defined, all terms (including technical terms and scientific terms) used herein have the same meaning as commonly understood by those of ordinary skill in the art to which this invention belongs.

Figure 1:
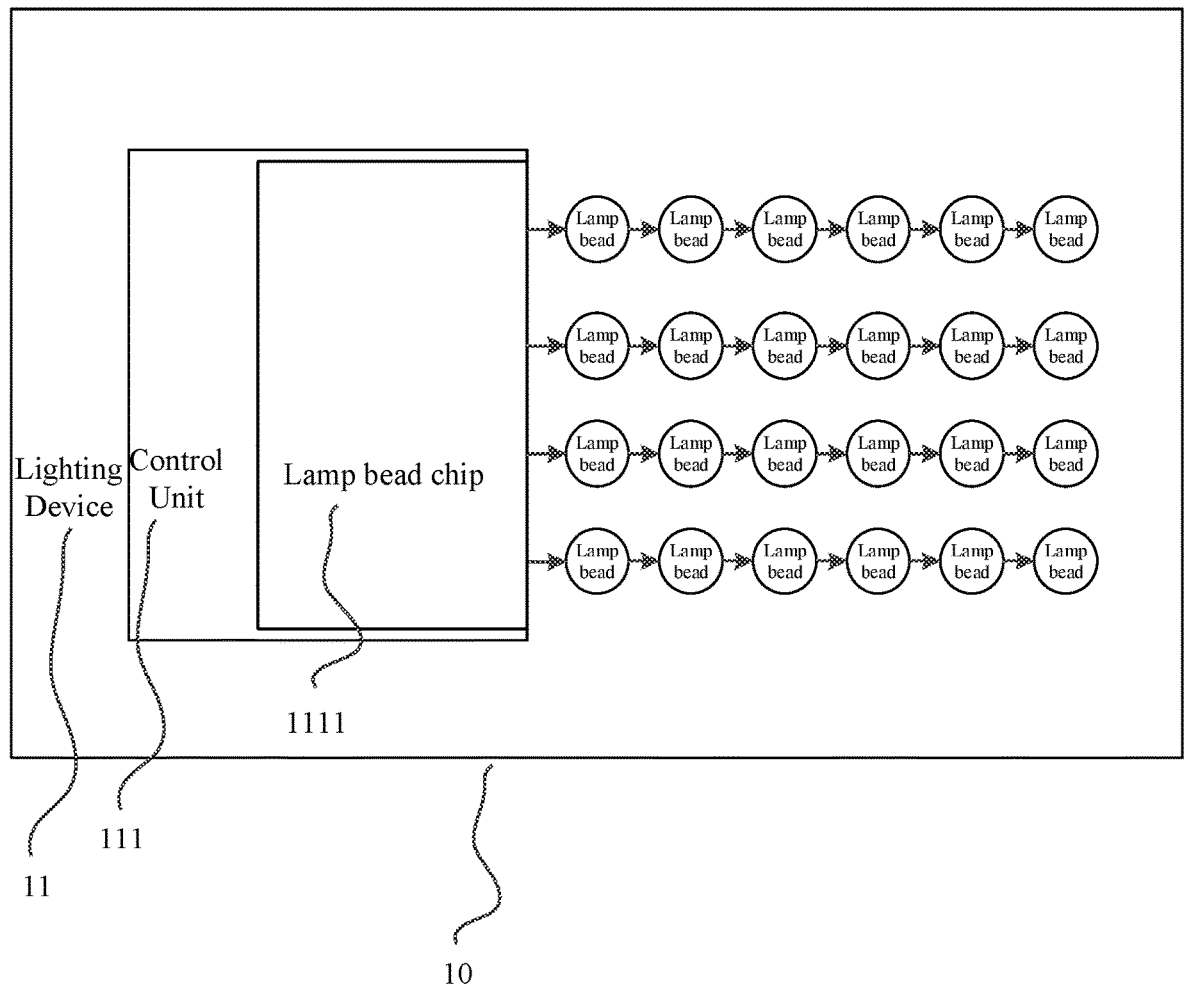
FIG. 1 illustrates a schematic circuit diagram of a lighting control device according to an embodiment of the present disclosure.

In an embodiment of the present disclosure, a lighting control method is implemented based on a lighting control device 10. Referring to FIG. 1, the lighting control device 10 includes a lighting device 11, and the lighting device 11 has a built-in control unit 111, at least one lamp bead chip 1111, and multiple lamp beads controlled by the lamp bead chip 1111.

In certain embodiments, the control unit 111 may be an SOC (system-on-chip), a CPU (central processing unit), an MPU (micro control unit), etc., and can be specifically configured according to actual use needs, without being limiting.

In some embodiments, the lighting device 11 may be a strip light, a bar light, a cylinder lamp, or a plane light (containing multiple lamp beads), etc.

The lighting device 11 includes a control unit 111 and one or more lamp bead chips 1111. Each lamp bead chip is used to control at least one light strip. Each light strip includes a corresponding number of light-emitting units corresponding to at least one pixel point. Each light-emitting unit includes a plurality of lamp beads of different colors. In the same light strip, the lamp beads of the same color are connected in series and belong to the same light-emitting channel.

In some embodiments, the position and quantity of the lighting devices 11 can be set according to actual needs, and the length, height, and area of the light source can also be controlled according to the positions of the lighting devices 11.

Figure 2:
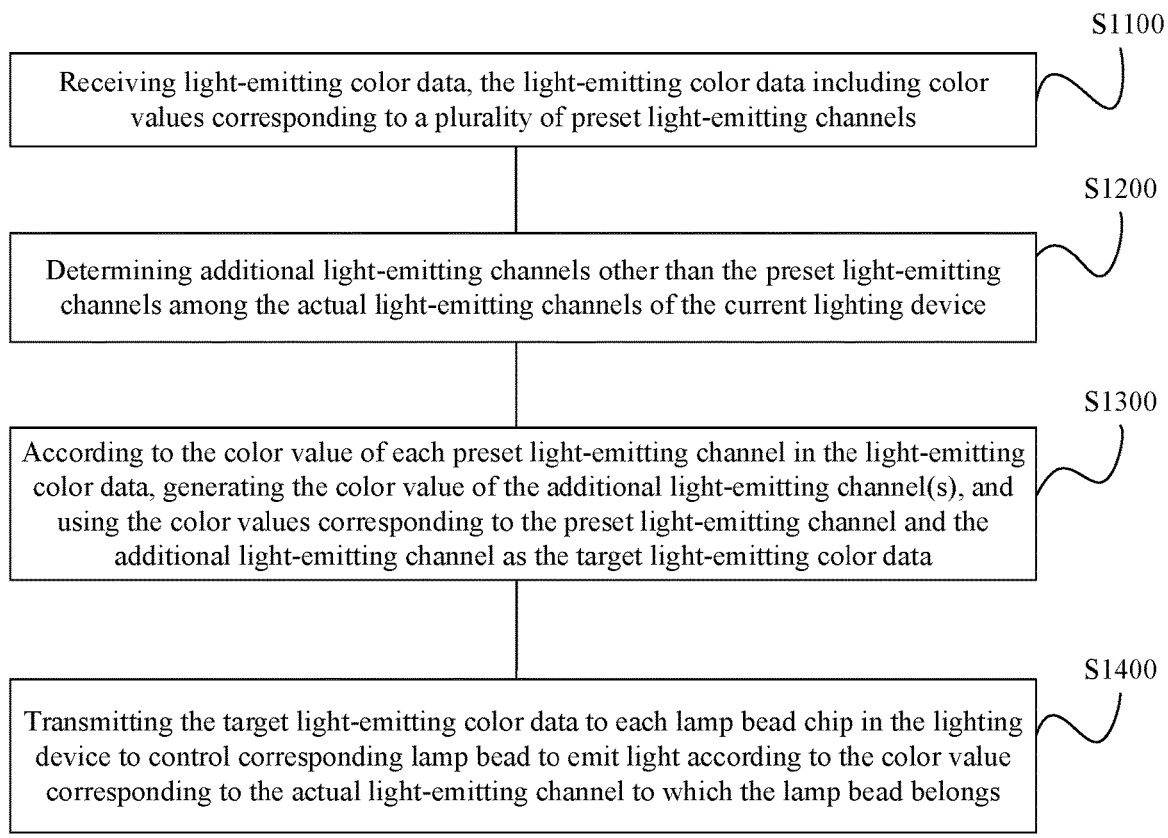
FIG. 2 illustrates a schematic flowchart of a lighting control method according to an embodiment of the present disclosure.

The light control method of the present disclosure can be implemented based on the above-described light control device. Specifically, referring to FIG. 2, the light control method includes the following.

S1100, receiving light-emitting color data, the light-emitting color data including color values corresponding to a plurality of preset light-emitting channels.

The built-in control unit of the lighting device and a client terminal can be connected through a network. The network is usually the Internet, but can be any network including a Local Area Network (LAN), a Metropolitan Area Network (MAN), a Wide Area Network (WAN), a mobile network, a wired or wireless network, a private network, or a virtual private network, or any combination thereof.

In some implementations, the control unit and the client terminal may also communicate through a specific communication protocol. The communication protocol includes BLE (Bluetooth low energy, Bluetooth low energy) protocol, WLAN (wireless local area network) protocol, Bluetooth protocol, ZigBee protocol, or Wi Fi (wireless fidelity) protocol, etc.

The client terminal include any appropriate terminal device used by ordinary users, and a client end may refer to a program installed on the client terminal that provides local services to the user.

In one embodiment, the user can specify in the client end loaded on the terminal device the color values corresponding to the multiple preset light-emitting channels corresponding to the color of the light emitted by the lighting device. After the user specifies the color, the color values corresponding to the multiple preset light-emitting channels are used as the light-emitting color data. The client end is connected to the control unit of the lighting device and pushes the light-emitting color data to the control unit.

The multiple preset light-emitting channels refer to the three light-emitting channels of R, G, and B. It can be understood that, according to the principle of three primary colors in Optics, the color values corresponding to the three light-emitting channels of R, G, and B are mixed according to a certain ratio. Specifically, in combination with the sensitivity of human eyes, 3 bytes (3*8 bits) are used to respectively represent the luminous intensity values of Red, Green, and Blue in a pixel. The value range of each light-emitting channel is: 0~256 (2 to the 8th power). For example, when the color values corresponding to the three light-emitting channels R, G, and B are (255, 255, 255), it means that pure white light is emitted; when the color values corresponding to the three light-emitting channels R, G, and B are (255, 0, 0), it means the reddest light is emitted; when the color values corresponding to the three light-emitting channels R, G, and B are (0, 255, 0), it means that the greenest light is emitted, and so on.

S1200, determining additional light-emitting channels other than the preset light-emitting channels among the actual light-emitting channels of the current lighting device.

In one embodiment, the actual light-emitting channels include a plurality of the preset light-emitting channels, i.e., the three light-emitting channels R, G, and B, and a single light-emitting channel W, where the light-emitting channel W is used to emit white light. The control unit of the lighting device may determine that an additional light-emitting channel other than the plurality of preset light-emitting channels is a single light-emitting channel W according to the actual light-emitting channels of the lighting device.

In another embodiment, the actual light-emitting channels include a plurality of the preset light-emitting channels, namely R, G, and B three light-emitting channels, and two different light-emitting channels, one light-emitting channel W1 is used to emit cool white light, and the other light-emitting channel W2 is used to emit warm white light. The control unit of the lighting device can determine, based on the actual light-emitting channels of the lighting device, that the additional light-emitting channels other than the preset plurality of light-emitting channels include two different light-emitting channels W1 and W2.

S1300, according to the color value of each preset light-emitting channel in the light-emitting color data, generating the color value of the additional light-emitting channel(s), and using the color values corresponding to the preset light-emitting channels and the additional light-emitting channel as the target light-emitting color data.

According to the maximum and minimum values of the color values of each preset light-emitting channel in the light-emitting color data, the corresponding saturation can be calculated. According to the saturation, a matching brightness ratio can be preset to control the mixing ratio of pure color and white color. The value range of the brightness ratio is (0, 1]. Those skilled in the art can understand that the brightness ratio can be set according to actual needed, and the recommended brightness ratio includes 0.9. In addition, the color value of each preset light-emitting channel in the light-emitting color data match the corresponding weights, respectively, and the sum of the weights is 1, so as to reasonably smoothen the color values of each preset light-emitting channel, and the corresponding pure color visual effect is better. Those skilled in the art can set the weights as needed according to the present disclosure. The recommended color values of the three light-emitting channels of R, G, and B are respectively matched with the corresponding weights of (0.243, 0.726, 0.031). Further, according to the saturation and its matching brightness ratio, and the color values of each preset light-emitting channel and the corresponding matching weights, the first color value can be calculated using the following formula:

$$F=((1-S)*d+(1-d))*(aR+bG+cB)$$

where F is the first color value, S is the saturation, d is the brightness coefficient and $0 \leq d \leq 1$, R, G, and B correspond to the color values of the three light-emitting channels of R, G, and B, and a, b, and c correspond to the weights that match the color values of the three light-emitting channels of R, G, and B respectively, and a+b+c=1.

In an embodiment, when the number of additional light-emitting channels is a single light-emitting channel W, its corresponding color value can be determined as the first color value.

In another embodiment, when the number of additional light-emitting channels are two different light-emitting channels, light-emitting channel W1 and light-emitting channel W2, because the light-emitting channel W1 emits cool white light, and the light-emitting channel W2 emits warm white light, it is obtained based on splitting the white light displayed according to the first color value. Accordingly, matching weights are preset for the color values corresponding to the light-emitting channel W1 and the light-emitting channel W2. Based on the first color value, the color values corresponding to the light-emitting channel W1 and the light-emitting channel W2 can be determined, and the sum of the weights is 1. The following formula can be used:

$$F = pw_1 + qw_2$$

where F is the first color value, p and q correspond to the weights that match the color value of the light-emitting channel W1 and the color value of the light-emitting channel W2, respectively, and p+q=1, w1 and w2 are the color values of the corresponding light-emitting channel W1 and the color value of the light-emitting channel W2, respectively.

Further, using the color values of each preset luminescence channel specified by the light-emitting color data as the color values corresponding to the same light-emitting channel in the actual light-emitting channels, and constructing the color values of each light-emitting channel in the actual light-emitting channels as the target light-emitting color data.

S1400, transmitting the target light-emitting color data to each lamp bead chip in the lighting device to control the corresponding lamp bead to emit light according to the color value corresponding to the actual light-emitting channel to which the lamp bead belongs.

In one embodiment, the lighting device has a built-in lamp bead chip, and the lamp bead chip controls at least one light strip. Each light strip includes a corresponding number of light-emitting units corresponding to at least one pixel point. The control unit of the lighting device transmits the target light-emitting color data to the lamp bead chip. Based on the target light-emitting color data, the lamp chip generates target light-emitting color data for each light-emitting unit, and sends the target light-emitting color data to each light-emitting unit, so as to control multiple light-emitting lamp beads of different colors in each light-emitting unit to emit light according to the color value corresponding to the actual light-emitting channel to which the light-emitting unit belongs. The number of target light-emitting color data items are the same as the number of light-emitting units.

In another embodiment, the lighting device has built-in multiple lamp bead chips, and each lamp bead chip correspondingly performs the above described processes.

According to the embodiments of the present disclosure, it can be known that the technical solution of the present disclosure has certain advantages. For example, according to the present disclosure, receiving the light-emitting color data, which includes color values corresponding to a plurality of preset light-emitting channels; determining additional light-emitting channel(s) other than the preset light-emitting channels in the actual light-emitting channels; generating color values of additional light-emitting channels according to the color values of each preset light-emitting channel; determines the color values corresponding to each light-emitting channel in the actual light-emitting channel as the target light-emitting color data; and transmitting the target light-emitting color data to each lamp bead chip in the lighting device to control the corresponding lamp beads to emit light according to the color value corresponding to the actual light-emitting channel. Thus, after receiving the color values corresponding to the multiple preset light-emitting channels in real time, the lighting device can dynamically generate color values corresponding to additional light-emitting channels in a timely manner without manual setting, improving reliability and scalability.

Figure 3:
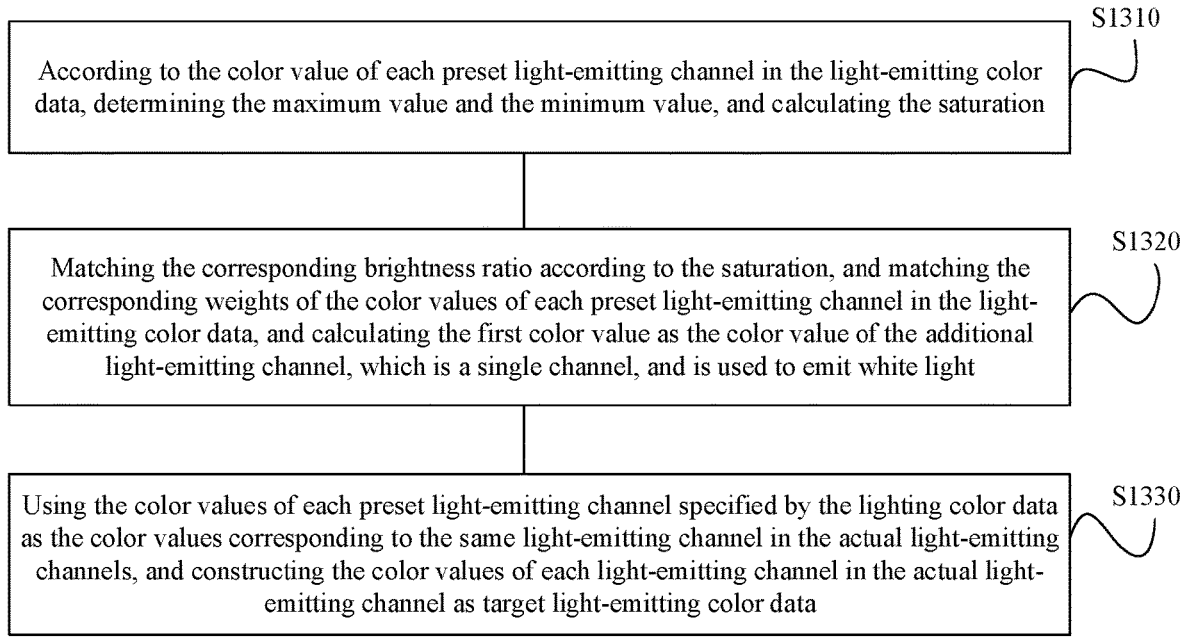
FIG. 3 illustrates a schematic flowchart of constructing corresponding target light-emitting data based on a single-channel additional light-emitting channel in a lighting control method according to an embodiment of the present disclosure.

Referring to FIG. 3, in one embodiment, S1300, according to the color value of each preset light-emitting channel in the light-emitting color data, generating the color value of the additional light-emitting channel(s), and using the color values corresponding to the preset light-emitting channels and the additional light-emitting channel as the target light-emitting color data, may further include the following.

S1310, according to the color value of each preset light-emitting channel in the light-emitting color data, determining the maximum value and the minimum value, and calculating the saturation, using, for example, the following formula:

$$S = \frac{\max - \min}{\max}$$

where S is saturation, max is the maximum value among the color values of each preset light-emitting channel in the light-emitting color data, and min is the minimum value among the color values of each preset light-emitting channel in the light-emitting color data.

S1320, matching the corresponding brightness ratio according to the saturation, and matching the corresponding weights of the color values of each preset light-emitting channel in the light-emitting color data, and calculating the first color value as the color value of the additional light-emitting channel. The additional light-emitting channel is a single channel, and is used to emit white light.

According to the saturation, a matching brightness ratio can be preset to control the mixing ratio of pure color and white color. The value range of the brightness ratio is (0, 1]. Those skilled in the art understand that the brightness ratio can be set as needed, and the recommended brightness ratio is approximately 0.9.

The color values of each preset light-emitting channel in the light-emitting color data are matched with the corresponding weights respectively, and the sum of each weight is 1, so that the color values of each preset light-emitting channel are reasonably smoothed, and the corresponding pure color visual effect is better. Those skilled in the art understand that the respective weights can be set according to actual requirements. The recommended weights matched with the color values of the three light-emitting channels of R, G, and B are respectively (0.243, 0.726, 0.031).

The first color value can be calculated using the following formula:

$$F = d * \frac{\min}{\max} * (aR + bG + cB) + (1-d) * (aR + bG + cB)$$

where F is the first color value, max is the maximum value among the color values of each preset light-emitting channel in the light-emitting color data, min is the minimum value among the color values of each preset light-emitting channel in the light-emitting color data, d is a brightness coefficient and 0≤d≤1, R, G, and B correspond to the color values of the three light-emitting channels R, G, and B, and a, b, and c correspond to the weights that match the color values of the three light-emitting channels R, G, and B respectively, and a+b+c=1.

S1330: using the color values of each preset light-emitting channel specified by the lighting color data as the color values corresponding to the same light-emitting channel in the actual light-emitting channels, and constructing the color values of each light-emitting channel in the actual light-emitting channel as target light-emitting color data.

The actual light-emitting channels include the same three light-emitting channels as the preset light-emitting channels specified by the light-emitting color data, that is, three light-emitting channels R, G, and B, so the color values of these three light-emitting channels can be set according to the color values of each preset light-emitting channel in the corresponding light-emitting color data. The color values of the three light-emitting channels R, G, and B in the actual light-emitting channels and additional light-emitting channel(s) are constructed as the target light-emitting color data.

Accordingly, based on the color values of each preset light-emitting channel in the light-emitting color data, the color value of the additional light-emitting channel of a single light-emitting channel in the actual light-emitting channel is dynamically determined, and the whole process is performed automatically (e.g., based on an algorithm) to achieve high efficiency and convenience, without manual setting, and improving reliability and scalability.

Figure 4:
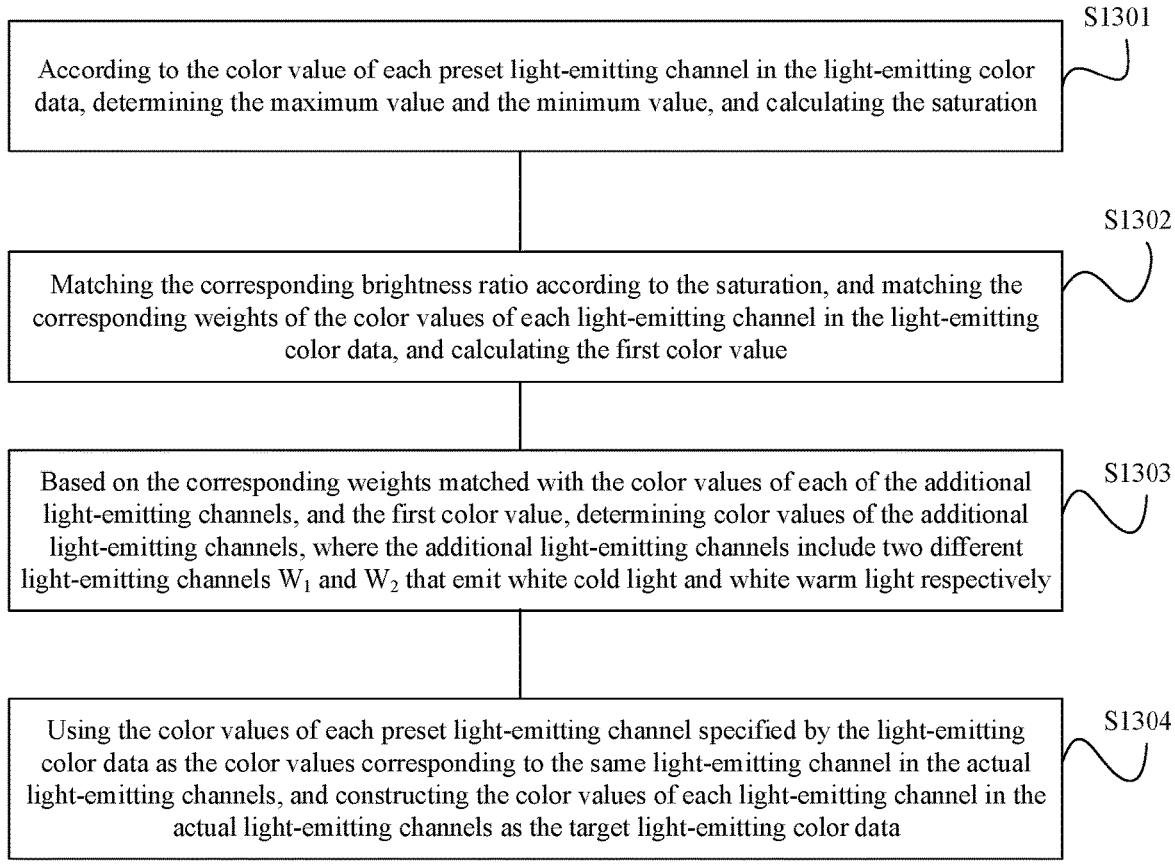
FIG. 4 illustrates a schematic flowchart diagram of constructing corresponding target light-emitting data based on two-channel additional light-emitting channels in a lighting control method according to an embodiment of the present disclosure.

Referring to FIG. 4, in one embodiment, S1300, according to the color value of each preset light-emitting channel in the light-emitting color data, generating the color value of the additional light-emitting channel(s), and using the color values corresponding to the preset light-emitting channels and the additional light-emitting channel as the target light-emitting color data, may further include the following.

S1301, according to the color value of each preset light-emitting channel in the light-emitting color data, determining the maximum value and the minimum value, and calculating the saturation, using, for example, the following formula:

$$S = \frac{\max - \min}{\max}$$

where S is saturation, max is the maximum value among the color values of each preset light-emitting channel in the light-emitting color data, and min is the minimum value among the color values of each preset light-emitting channel in the light-emitting color data.

S1302, matching the corresponding brightness ratio according to the saturation, and matching the corresponding weights of the color values of each light-emitting channel in the light-emitting color data, and calculating the first color value.

According to the saturation, a matching brightness ratio can be preset to control the mixing ratio of pure color and white color. The value range of the brightness ratio is (0, 1]. Those skilled in the art understand that the brightness ratio can be set as needed, and the recommended brightness ratio is approximately 0.9.

The color values of each preset light-emitting channel in the light-emitting color data are matched with the corresponding weights respectively, and the sum of each weight is 1, so that the color values of each preset light-emitting channel are reasonably smoothed, and the corresponding pure color visual effect is better. Those skilled in the art understand that the respective weights can be set according to actual requirements. The recommended weights matched with the color values of the three light-emitting channels of R, G, and B are respectively (0.243, 0.726, 0.031).

The first color value can be calculated using the following formula:

$$F = d * \frac{\min}{\max} * (aR + bG + cB) + (1-d) * (aR + bG + cB)$$

where F is the first color value, max is the maximum value among the color values of each preset light-emitting channel in the light-emitting color data, min is the minimum value among the color values of each preset light-emitting channel in the light-emitting color data, d is a brightness coefficient and 0≤d≤1, R, G, and B correspond to the color values of the three light-emitting channels R, G, and B, and a, b, and c correspond to the weights that match the color values of the three light-emitting channels R, G, and B respectively, and a+b+c=1.

S1303: based on the corresponding weights matched with the color values of each of the additional light-emitting channels, and the first color value, determining the color values of each of the additional light-emitting channels, where the additional light-emitting channels include two different light-emitting channels W1 and W2 that emit white cold light and white warm light respectively.

Because the light-emitting channel W1 emits cool white light, and the light-emitting channel W2 emits warm white light, it is obtained based on splitting the white light displayed according to the first color value. Accordingly, matching weights are preset for the color values corresponding to the light-emitting channel W1 and the light-emitting channel W2. Based on the first color value, the color values corresponding to the light-emitting channel W1 and the light-emitting channel W2 can be determined, and the sum of the weights is 1. The following formula can be used:

$$F = pw_1 + qw_2$$

where F is the first color value, p and q correspond to the weights that match the color value of the light-emitting channel W1 and the color value of the light-emitting channel W2, respectively, and p+q=1, w1 and w2 are the color values of the corresponding light-emitting channel W1 and the color value of the light-emitting channel W2, respectively.

S1304, using the color values of each preset light-emitting channel specified by the light-emitting color data as the color values corresponding to the same light-emitting channel in the actual light-emitting channels, and constructing the color values of each light-emitting channel in the actual light-emitting channels as the target light-emitting color data.

The actual light-emitting channels include the same three light-emitting channels as the preset light-emitting channels specified by the light-emitting color data, that is, three light-emitting channels R, G, and B, so the color values of these three light-emitting channels can be set according to the color values of each preset light-emitting channel in the corresponding light-emitting color data. The color values of the three light-emitting channels R, G, and B in the actual light-emitting channels and additional light-emitting channels are constructed as the target light-emitting color data.

Accordingly, based on the color values of each preset light-emitting channel in the light-emitting color data, the color values of the additional light-emitting channels of two light-emitting channels in the actual light-emitting channel are dynamically determined, and the whole process is performed automatically (e.g., based on an algorithm) to achieve high efficiency and convenience, without manual setting, and improving reliability and scalability.

Figure 5:
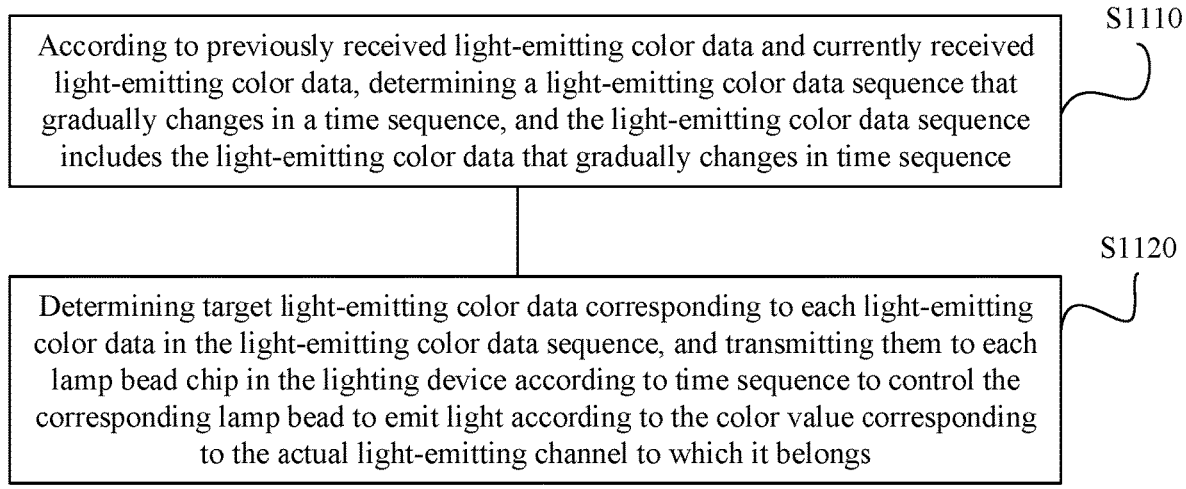
FIG. 5 illustrates a schematic flowchart diagram of obtaining an image sequence in a lighting control method according to an embodiment of the present disclosure.

Referring to FIG. 5, in one embodiment, S1100, receiving the light-emitting color data may include the following.

S1110, according to previously received light-emitting color data and the currently received light-emitting color data, determining a light-emitting color data sequence that gradually changes in a time sequence, and the light-emitting color data sequence includes the light-emitting color data that gradually changes in time sequence.

The light-emitting color data gradually changing in time sequence can be calculated, for example, using the following formula:

$$\text{Gradient} = A + (B-A)*N/\text{Step}$$

where Gradient is the light-emitting color data that gradually changes at the Nth time step, that is, the corresponding time sequence, A is the light-emitting color data previous received last time, B is the currently received light-emitting color data, Step is the total number of time steps that A has gradually changed to B, and N is the current time step. The Step can be set as needed.

For example, according to the above formula, provided that, in the last received light-emitting color data, the color values of R, G, and B three light-emitting channels are respectively (200, 50, 0), and after Step (being set to 3), the color values of R, G, and B three light-emitting channels in the currently received light-emitting color data are respectively (50, 200, 0), and the light-emitting color data of each time step and sequence is calculated as following.

$N=1$, that is, the first step:

$$R1=200+(50-200)*1/3=150$$

$$G1=50+(200-50)*1/3=100$$

$$B1=0+(0-0)*1/3=0$$

Gradient $(R1, G1, B1)=(150, 100, 0)$ $N=2$, namely the second step:

$$R2=200+(50-200)*2/3=100$$

$$G2=50+(200-50)*2/3=150$$

$$B2=0+(0-0)*2/3=0$$

Gradient $(R2, G2, B2)=(100, 150, 0)$ $N=3$, namely the third step:

$$R3=200+(50-200)*3/3=50$$

$$G3=50+(200-50)*3/3=200$$

$$B3=0+(0-0)*3/3=0$$

Gradient $(R3, G3, B3)=(50, 200, 0)$

S1120, determining the target light-emitting color data corresponding to each light-emitting color data in the light-emitting color data sequence, and transmitting them to each lamp bead chip in the lighting device according to time sequence to control the corresponding lamp bead to emit light according to the color value corresponding to the actual light-emitting channel to which it belongs.

According to any lighting control method implemented in the present disclosure, the control unit determines the target light-emitting color data corresponding to each light-emitting color data in the light-emitting color data sequence, and then inputs them to the lamp bead chip of the lighting device one by one according to the time sequence (i.e., sequentially in time). In one embodiment, the lighting device has a built-in lamp bead chip, and the lamp bead chip controls at least one light strip. Each light strip includes a corresponding number of light-emitting units corresponding to at least one pixel point. The control unit of the lighting device transmits the target light-emitting color data to the lamp bead chip, generates the target light-emitting color data of the number of light-emitting units based on a single target light-emitting color data, and distributes the target light-emitting color data to each light-emitting unit, so as to control multiple lamp beads of different colors in each light-emitting unit to emit color light according to the color values corresponding to the actual light-emitting channels to which they belong.

In another embodiment, the lighting device has built-in multiple lamp bead chips, and each lamp bead chip is correspondingly implemented according to the above-mentioned embodiments.

In one embodiment, by determining that the light-emitting color data received last time has gradually changed into the light-emitting color data sequence corresponding to the currently received light-emitting color data at each time sequence, the light-emitting color data that has gradually changed at each time sequence is inputted to the lighting device according to the time sequence, and the lighting device emits light correspondingly. As such, when the light-emitting color data changes, the corresponding light emission change of the lighting device will not occur instantaneously, but rather present a visual effect of colorful gradients under the time sequence, bringing an improved visual experience to the user.

Figure 6:
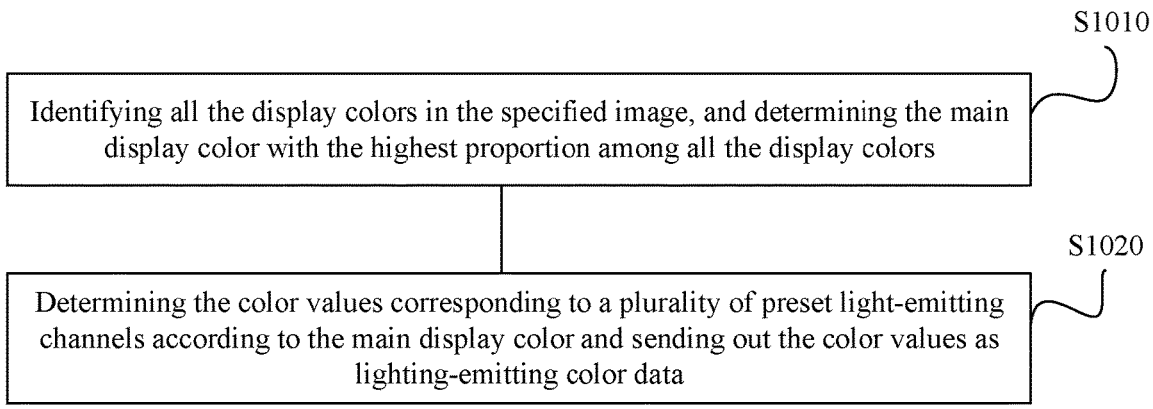
FIG. 6 illustrates a schematic flowchart diagram of determining corresponding light-emitting color data according to the main display color of a specified image in a lighting control method according to an embodiment of the present disclosure.

Referring to FIG. 6, in one embodiment, in S1100, before receiving the light-emitting color data, the following may be included.

S1010, identifying all the display colors in the specified image, and determining the main display color with the highest proportion among all the display colors.

In one embodiment, using the client end loaded on the terminal device, the user can input an image, such as a high-definition computer desktop wallpaper picture, a high-definition mobile phone desktop wallpaper picture, a photo, etc. After the user inputs the image, the image is used as the specified image.

Further, using the existing RGB algorithm for capturing pixels in the image, identifying the color displayed by each pixel in the specified image as the display color, and then determining the number corresponding to each display color, and the display color with the largest number is selected as the main display color. It is not difficult to understand that from the data level, the specified image is mainly displayed using the main display color, and the pixel capturing RGB algorithm can also be flexibly implemented by those skilled in the art.

S1020, determining the color values corresponding to a plurality of preset light-emitting channels according to the main display color and sending out the color values as lighting-emitting color data.

According to the principle of three primary colors, the color values of the three light-emitting channels R, G, and B can be determined according to the main display color to be the light-emitting color data, and the client end is connected to the control unit of the lighting device to push the light-emitting color data to the control unit.

In one embodiment, by determining the main display color mainly used for display of the specified image, color values corresponding to multiple preset light-emitting channels are determined and pushed as light-emitting color data. On the one hand, the specified image can be efficiently identified, and the corresponding light-emitting color data can be reasonably determined; on the other hand, according to the light-emitting color data, the corresponding lighting visual effect of the lighting device can be paired with the specified image, bringing an improved visual experience to the user.

Figure 7:
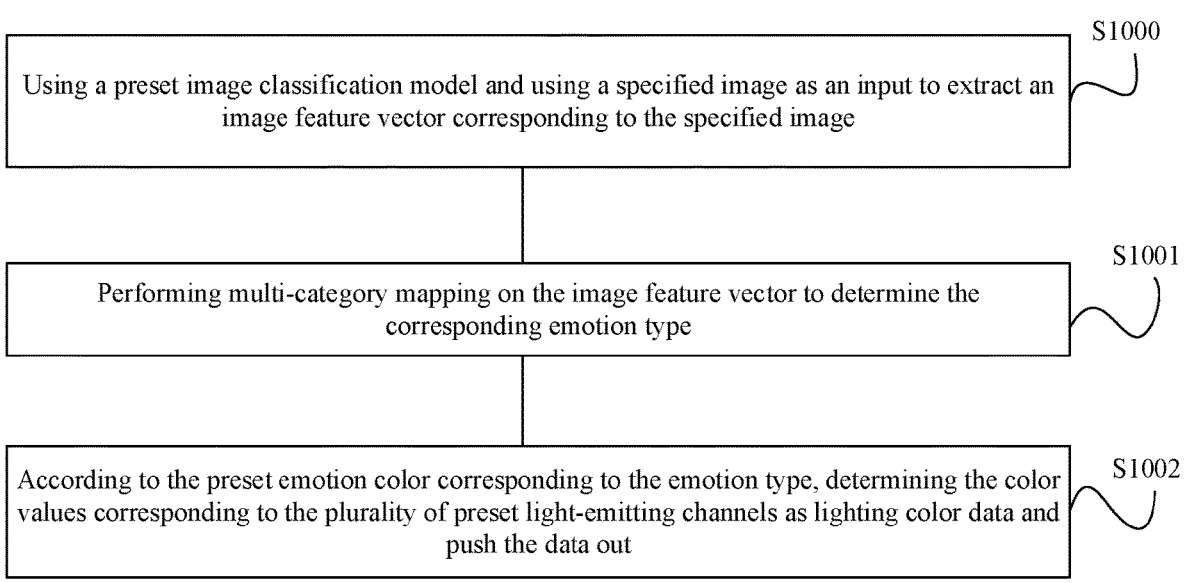
FIG. 7 illustrates a schematic flowchart diagram of determining corresponding light-emitting color data according to a specified image using an image classification model in a lighting control method according to an embodiment of the present disclosure.

Referring to FIG. 7, in one embodiment, in S1100, before receiving the light-emitting color data, the following may be included.

S1000, using a preset image classification model with a specified image as an input to extract an image feature vector corresponding to the specified image.

In one embodiment, the user can input an image, such as a high-definition computer desktop wallpaper picture, a high-definition mobile phone desktop wallpaper picture, a photo, etc., to the client end loaded on the user's terminal device. After the user inputs the image, the image is used as the specified image.

The structure of the image classification model is an image feature extraction network followed by a classifier. The image feature extraction network is suitable for extracting the image semantic features of the input image. The specific selection can be any ready-to-use model such as Resnet series, VGG, Mobilenet series, etc. In an embodiment, the image feature extraction network is a MobilenetV2 model, which has the advantages of light weight and high accuracy, so it is convenient for rapid deployment, and can quickly and accurately extract the image semantic features of the specified image, and correspondingly requires less computing resources. Of course, those skilled in the art can also build an image feature extraction network by themselves, as long as the image semantic features of the input image can be extracted. The classifier can be implemented by a full connection layer or MLP, and the full connection layer can be a global convolution with convolution kernels h and w, where h and w are the height and width of the convolution result of the previous layer, respectively. In view that any of these ready-to-use image feature extraction networks followed by a classifier to form an image classification model training process is known to those skilled in the art, the training process will not be described in detail.

Further, in one embodiment, the image feature extraction network adopts the MobilenetV2 model, and the image feature extraction network in the image classification model uses the specified image as an input, and first expands the low-dimensional compressed representation of the specified image to a high-dimensional representation through the inverted residual structure of the linear bottleneck, uses lightweight deep convolution (DW) to extract image semantic features, and finally uses linear convolution to project the image semantic features back to the low-dimensional representation to obtain corresponding image feature vectors.

S1001, performing multi-category mapping on the image feature vector to determine the corresponding emotion type.

The classifier in the image classification model is used to perform multi-classification mapping on the image feature vector, and the image feature vector is linearly mapped to a plurality of different preset classification spaces, and each classification space represents an emotion type, and the corresponding classification probability mapped to each classification space is obtained, and the emotion type represented by the classification space with the largest classification probability is determined as the emotion type corresponding to the image feature vector. The emotional types and their numbers can be set by those skilled in the art as needed. For example, eight emotional types can be fresh, love, cold, excited, warm, cute, melancholy, and happy.

S1002, according to the preset emotion color corresponding to the emotion type, determining the color values corresponding to the plurality of preset light-emitting channels as lighting color data and pushing the data out.

Corresponding emotion colors can be preset for each emotion type, for example, if the emotion type is cute, the corresponding emotion color is orange, and if the emotion type is cool, the corresponding emotion color is dark gray, etc. Those skilled in the art can set it as required. According to the principle of three primary colors, the color values of the three light-emitting channels of R, G, and B can be determined according to the emotional color as the light-emitting color data, and the client end is connected to the control unit of the lighting device to push the light-emitting color data to the control unit.

Accordingly, the emotion type corresponding to the specified image is accurately determined by using the image classification model, and the color values corresponding to multiple preset light-emitting channels are determined according to the corresponding preset emotional colors as light-emitting color data to be sent out. On the one hand, the emotion contained in the specified image can be accurately determined, and the corresponding light-emitting color data can be reasonably determined. On the other hand, the corresponding lighting visual effect of the lighting device according to the light-emitting color data can match the specified image, bringing a good visual experience to the user.

Figure 8:
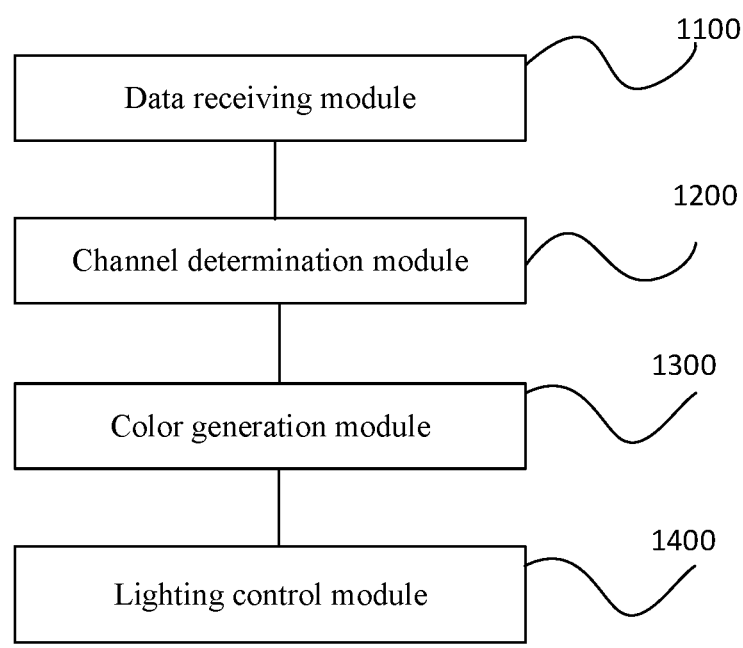
FIG. 8 illustrates a schematic structural diagram of a lighting control device according to an embodiment of the present disclosure.

The present disclosure also provides a lighting control device, referring to FIG. 8, the lighting control device includes a data receiving module 1100, a channel determination module 1200, a color generation module 1300, and a lighting control module 1400, etc.

The data receiving module 1100 is configured to receive light-emitting color data, the light-emitting color data including color values corresponding to a plurality of preset light-emitting channels.

The channel determination module 1200 is configured to determine at least one additional light-emitting channel other than the preset light-emitting channels among the actual light-emitting channels of the current lighting device.

The color generation module 1300 is configured to, according to the color value of each preset light-emitting channel in the light-emitting color data, generate the color value of the additional light-emitting channel(s), and use the color values corresponding to the preset light-emitting channels and the additional light-emitting channel as the target light-emitting color data.

The lighting control module 1400 is configured to transmit the target light-emitting color data to each lamp bead chip in the lighting device to control the corresponding lamp bead to emit light according to the color value corresponding to the actual light-emitting channel to which the lamp bead belongs.

In one embodiment, the channel determination module 1300 includes: a saturation calculation submodule, a first color calculation submodule, and a first target lighting color data construction submodule.

The saturation calculation submodule is configured to, according to the color value of each preset light-emitting channel in the light-emitting color data, determine the maximum value and the minimum value, and calculate the saturation. The first color calculation submodule is configured to match the corresponding brightness ratio according to the saturation, and match the corresponding weights of the color values of each preset light-emitting channel in the light-emitting color data, and calculate the first color value as the color value of the additional light-emitting channel. The additional light-emitting channel is a single, and is used to emit white light. The first target lighting color data construction submodule is configured to use the color values of each preset light-emitting channel specified by the lighting color data as the color values corresponding to the same light-emitting channel in the actual light-emitting channels, and construct the color values of each light-emitting channel in the actual light-emitting channel as target lighting color data.

In one embodiment, the channel determination module 1300 includes: a saturation calculation submodule, a first color calculation submodule, an additional light-emitting channel color value determination submodule, and a second target lighting color data construction submodule.

The saturation calculation submodule is configured to, according to the color value of each preset light-emitting channel in the light-emitting color data, determine the maximum value and the minimum value, and calculate the saturation. The first color calculation submodule is configured to match the corresponding brightness ratio according to the saturation, and match the corresponding weights of the color values of each light-emitting channel in the light-emitting color data, and calculate the first color value. The additional light-emitting channel color value determination submodule is configured to, based on the corresponding weights matched with the color values of each of the additional light-emitting channels, and the first color value, determine the color values of each of the additional light-emitting channels, where the additional light-emitting channels include two different light-emitting channels that emit white cold light and white warm light respectively. The second target lighting color data construction submodule is configured to use the color values of each preset luminescence channel specified by the light-emitting color data as the color values corresponding to the same light-emitting channel in the actual light-emitting channels, and construct the color values of each light-emitting channel in the actual light-emitting channels as the target light-emitting color data.

In one embodiment, the data receiving module 1100 includes: a sequence determination sub-module, and a target light-emitting color data determination sub-module.

The sequence determination sub-module is configured to, according to previously received light-emitting color data and the currently received light-emitting color data, determine a light-emitting color data sequence that gradually changes in a time sequence, and the light-emitting color data sequence includes the light-emitting color data that gradually changes in time sequence. The target light-emitting color data determination sub-module is configured to determine the target light-emitting color data corresponding to each light-emitting color data in the light-emitting color data sequence, and transmit them to each lamp bead chip in the lighting device according to time sequence to control the corresponding lamp bead to emit light according to the color value corresponding to the actual light-emitting channel to which it belongs.

In one embodiment, the data receiving module 1100 or the lighting control device may further include: a color identification submodule, and a first data push submodule.

The color identification submodule is configured to identify all the display colors in the specified image, and determine the main display color with the highest proportion among all the display colors. The first data push submodule is configured to determine the color values corresponding to a plurality of preset light-emitting channels according to the main display color and send out the color values as lighting-emitting color data.

In one embodiment, the data receiving module 1100 or the lighting control device may further include: a feature extraction submodule, a classification mapping submodule, and a second data push submodule.

The feature extraction submodule is configured to use a preset image classification model with a specified image as an input to extract an image feature vector corresponding to the specified image. The classification mapping submodule is configured to perform multi-category mapping on the image feature vector to determine the corresponding emotion type. The second data push submodule is configured to, according to the preset emotion color corresponding to the emotion type, determine the color values corresponding to the plurality of preset light-emitting channels as lighting color data and push the data out.

The present disclosure also provides a non-transitory storage medium for storing computer-readable instructions. When the computer-readable instructions are executed by one or more processors, the one or more processors are configured to perform a lighting control method according to various embodiments of the present disclosure.

The present disclosure also provides a computer program product containing computer programs/instructions, and when the computer programs/instructions are executed by one or more processors, the lighting control method according to various embodiments of the present disclosure can be implemented.

Accordingly, the present disclosure can automatically generate color values corresponding to additional light-emitting channels based on color values corresponding to multiple preset light-emitting channels, which is efficient and convenient to execute, and has improved reliability and scalability.

Those of ordinary skill in the art can understand that all or part of the processes in the various embodiments of the present disclosure can be realized by instructing related hardware through a computer program, and the computer program can be stored in a computer-readable storage medium. When the program is executed, the processes of the embodiments of the present disclosure can be implemented. The storage medium may be a computer-readable storage medium such as a magnetic disk, an optical disk, a read-only memory (ROM), or a random access memory (RAM), etc.

Those skilled in the art can understand that the various operations, methods, and steps, measures, and schemes in the processes that have been discussed in this disclosure can be replaced, changed, combined, or deleted. Furthermore, the various operations, methods, and other steps, measures, and schemes in the process that have been discussed in this disclosure can also be replaced, changed, rearranged, decomposed, combined, or deleted. Further, steps, measures, and schemes in the prior art that have operations, methods, and processes disclosed in the present disclosure may also be alternated, changed, rearranged, decomposed, combined, or deleted.

Finally, it should be noted that: the above embodiments are only used to illustrate the technical solutions of the present disclosure, but not to limit the present disclosure. Although the present disclosure has been described in detail with reference to the foregoing embodiments, those of ordinary skill in the art should understand that modifications can be made to the technical solutions described in the foregoing embodiments, or equivalent replacements are made to some of the technical features; and these modifications or replacements do not drive the essence of the corresponding technical solutions away from the spirit and scope of the technical solutions of the various embodiments of the present disclosure.

What is claimed is:

1. A lighting control method, comprising:
   receiving light-emitting color data, the light-emitting color data including color values corresponding to a plurality of preset light-emitting channels;
   determining at least one additional light-emitting channel other than the plurality of preset light-emitting channels among the actual light-emitting channels of a lighting device;
   generating a color value of the additional light-emitting channel according to color values of the plurality of preset light-emitting channels in the light-emitting color data, and using the color values corresponding to the plurality of preset light-emitting channels and the additional light-emitting channel as target light-emitting color data; and
   transmitting the target light-emitting color data to each lamp bead chip in the lighting device to control corresponding lamp beads to emit light according to the color values corresponding to the actual light-emitting channel to which the lamp beads belong,
   wherein generating a color value of the additional light-emitting channel according to color values of the plurality of preset light-emitting channels in the light-emitting color data further comprises:
   according to the color value of each preset light-emitting channel in the light-emitting color data, determining a maximum value and a minimum value, and calculating a saturation;
   matching a corresponding brightness ratio according to the saturation, and matching corresponding weights of the color values of the preset light-emitting channels in the light-emitting color data, and calculating a first color value, wherein the first color value is used as a color value of the additional light-emitting channel, and the additional light-emitting channel is a single channel and is used to emit white light; or, based on corresponding weights matched with color values of the additional light-emitting channels, and the first color value, determining the color values of the additional light-emitting channels, wherein the additional light-emitting channels include two different light-emitting channels that emit white cold light and white warm light respectively; and
   using the color value of each preset light-emitting channel specified by the lighting color data as the color value corresponding to the same light-emitting channel in the actual light-emitting channels, and constructing the color values of the light-emitting channels in the actual light-emitting channels as target lighting color data.

2. The lighting control method according to claim 1, wherein receiving the light-emitting color data further comprises:
   according to previously received light-emitting color data and currently received light-emitting color data, determine a light-emitting color data sequence that gradually changes in a time sequence, and the light-emitting color data sequence includes the light-emitting color data that gradually changes in time sequence; and
   determining the target light-emitting color data corresponding to each light-emitting color data in the light-emitting color data sequence, and transmitting the target light-emitting color data to each lamp bead chip in the lighting device according to the time sequence to control the corresponding lamp beads to emit light according to the color values corresponding to the actual light-emitting channel to which the lamp bead belong.

3. The lighting control method according to claim 1, wherein, before receiving the light-emitting color data, the method further comprises:
   identifying all display colors in a specified image, and determining a main display color with a highest proportion among all the display colors; and
   determining the color values corresponding to the plurality of preset light-emitting channels according to the main display color and sending out the color values as the lighting-emitting color data.

4. The lighting control method according to claim 1, wherein, before receiving the light-emitting color data, the method further comprises:
   use a preset image classification model with a specified image as an input to extract an image feature vector corresponding to the specified image;
   performing multi-category mapping on the image feature vector to determine a corresponding emotion type; and
   according to a preset emotion color corresponding to the emotion type, determining the color values corresponding to the plurality of preset light-emitting channels as lighting color data and sending out the lighting color data.

5. A lighting control device, comprising:
   a lighting device, wherein the lighting device includes a built-in control unit, at least one lamp bead chip, and a plurality of lamp beads controlled by the lamp bead chip,
   wherein the control unit is used to run a computer program to, when the computer program is running, implement a lighting control method comprising:
   receiving light-emitting color data, the light-emitting color data including color values corresponding to a plurality of preset light-emitting channels;
   determining at least one additional light-emitting channel other than the plurality of preset light-emitting channels among the actual light-emitting channels of the lighting device;
   generating a color value of the additional light-emitting channel according to color values of the plurality of preset light-emitting channels in the light-emitting color data, and using the color values corresponding to the plurality of preset light-emitting channels and the additional light-emitting channel as target light-emitting color data; and transmitting the target light-emitting color data to each lamp bead chip in the lighting device to control corresponding lamp beads to emit light according to the color values corresponding to the actual light-emitting channel to which the lamp beads belong, wherein generating a color value of the additional light-emitting channel according to color values of the plurality of preset light-emitting channels in the light-emitting color data further comprises:

according to the color value of each preset light-emitting channel in the light-emitting color data, determining a maximum value and a minimum value, and calculating a saturation;

matching a corresponding brightness ratio according to the saturation, and matching corresponding weights of the color values of the preset light-emitting channels in the light-emitting color data, and calculating a first color value, wherein the first color value is used as a color value of the additional light-emitting channel, and the additional light-emitting channel is a single channel and is used to emit white light; or, based on corresponding weights matched with color values of the additional light-emitting channels, and the first color value, determining the color values of the additional light-emitting channels, wherein the additional light-emitting light respectively; and using the color value of each preset light-emitting channel specified by the lighting color data as the color value corresponding to the same light-emitting channel in the actual light-emitting channels, and constructing the color values of the light-emitting channels in the actual light-emitting channels as target lighting color data.

6. The lighting control device according to claim 5, wherein receiving the light-emitting color data further comprises:

according to previously received light-emitting color data and currently received light-emitting color data, determine a light-emitting color data sequence that gradually changes in a time sequence, and the light-emitting color data sequence includes the light-emitting color data that gradually changes in time sequence; and determining the target light-emitting color data corresponding to each light-emitting color data in the light-emitting color data sequence, and transmitting the target light-emitting color data to each lamp bead chip in the lighting device according to the time sequence to control the corresponding lamp beads to emit light according to the color values corresponding to the actual light-emitting channel to which the lamp bead belong.

7. The lighting control device according to claim 5, wherein, before receiving the light-emitting color data, the method further comprises:

identifying all display colors in a specified image, and determining a main display color with a highest proportion among all the display colors; and determining the color values corresponding to the plurality of preset light-emitting channels according to the main display color and sending out the color values as the lighting-emitting color data.

8. The lighting control device according to claim 5, wherein, before receiving the light-emitting color data, the method further comprises:

use a preset image classification model with a specified image as an input to extract an image feature vector corresponding to the specified image;

performing multi-category mapping on the image feature vector to determine a corresponding emotion type; and according to a preset emotion color corresponding to the emotion type, determining the color values corresponding to the plurality of preset light-emitting channels as lighting color data and sending out the lighting color data.

9. A computer-readable storage medium, wherein the computer-readable storage medium stores computer program instructions for, when executed by one or more processors, performing a lighting control method, the method comprising:

receiving light-emitting color data, the light-emitting color data including color values corresponding to a plurality of preset light-emitting channels;

determining at least one additional light-emitting channel other than the plurality of preset light-emitting channels among the actual light-emitting channels of a lighting device;

generating a color value of the additional light-emitting channel according to color values of the plurality of preset light-emitting channels in the light-emitting color data, and using the color values corresponding to the plurality of preset light-emitting channels and the additional light-emitting channel as target light-emitting color data; and transmitting the target light-emitting color data to each lamp bead chip in the lighting device to control corresponding lamp beads to emit light according to the color values corresponding to the actual light-emitting channel to which the lamp beads belong, wherein generating a color value of the additional light-emitting channel according to color values of the plurality of preset light-emitting channels in the light-emitting color data further comprises:

according to the color value of each preset light-emitting channel in the light-emitting color data, determining a maximum value and a minimum value, and calculating a saturation;

matching a corresponding brightness ratio according to the saturation, and matching corresponding weights of the color values of the preset light-emitting channels in the light-emitting color data, and calculating a first color value, wherein the first color value is used as a color value of the additional light-emitting channel, and the additional light-emitting channel is a single channel and is used to emit white light; or, based on corresponding weights matched with color values of the additional light-emitting channels, and the first color value, determining the color values of the additional light-emitting channels, wherein the additional light-emitting channels include two different light-emitting channels that emit white cold light and white warm light respectively; and using the color value of each preset light-emitting channel specified by the lighting color data as the color value corresponding to the same light-emitting channel in the actual light-emitting channels, and constructing the color values of the light-emitting channels in the actual light-emitting channels as target lighting color data.

10. The computer-readable storage medium according to claim 9, wherein receiving the light-emitting color data further comprises:

according to previously received light-emitting color data and currently received light-emitting color data, determine a light-emitting color data sequence that gradually changes in a time sequence, and the light-emitting color data sequence includes the light-emitting color data that gradually changes in time sequence; and determining the target light-emitting color data corresponding to each light-emitting color data in the light-emitting color data sequence, and transmitting the target light-emitting color data to each lamp bead chip in the lighting device according to the time sequence to control the corresponding lamp beads to emit light according to the color values corresponding to the actual light-emitting channel to which the lamp bead belong.

11. The computer-readable storage medium according to claim 9, wherein, before receiving the light-emitting color data, the method further comprises:

identifying all display colors in a specified image, and determining a main display color with a highest proportion among all the display colors; and determining the color values corresponding to the plurality of preset light-emitting channels according to the main display color and sending out the color values as the lighting-emitting color data.

12. The computer-readable storage medium according to claim 9, wherein, before receiving the light-emitting color data, the method further comprises:

use a preset image classification model with a specified image as an input to extract an image feature vector corresponding to the specified image;

performing multi-category mapping on the image feature vector to determine a corresponding emotion type; and according to a preset emotion color corresponding to the emotion type, determining the color values corresponding to the plurality of preset light-emitting channels as lighting color data and sending out the lighting color data.

* * * * *